Figure 2:
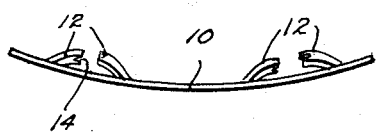

Aug. 14, 1945.    G. A. TINNERMAN    2,382,520
FASTENING DEVICE
Filed Oct. 11, 1943

INVENTOR.
George A. Tinnerman
Bates, Teare & McBean
Attorneys.

Patented Aug. 14, 1945

2,382,520

UNITED STATES PATENT OFFICE 2,382,520

FASTENING DEVICE

George A. Tinnerman, Cleveland, Ohio, assignor to Tinnerman Products, Inc., Cleveland, Ohio, a corporation of Ohio Application October 11, 1943, Serial No. 505,727

1 Claim. (Cl. 85—36)

This invention relates to a fastening device made of resilient sheet material so formed as to present a continuing pressure on the objects clamped.

More particularly, my fastening provides a single member of resilient sheet material curved into a concavo convex form and having two thread engaging portions on its concave face on opposite sides of the crest of the device so that when two threaded bolts engage the respective thread engagers the member is bent from its normal condition into or approaching a plane and the resultant reactance causes a continuous pressure against the member or members through which the bolts pass.

The invention has been found especially useful for holding the members of electric connections when there are several superimposed parts which should be maintained in tight engagement with each other.

A preferred form of my invention is illustrated in the drawing hereof and is hereinafter more fully explained and the essential novel features are summarized in the claim.

Figure 1:
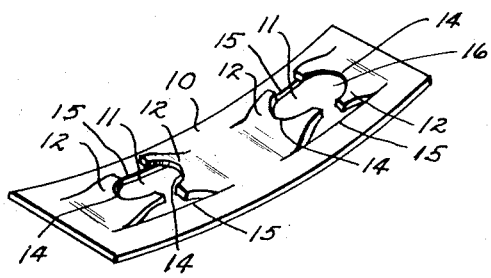
Figure 3:
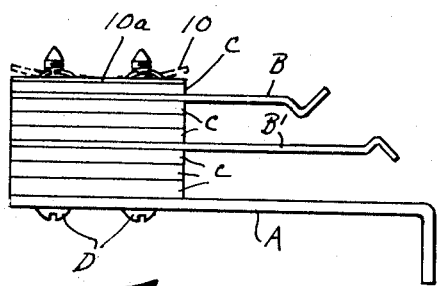
Figure 4:
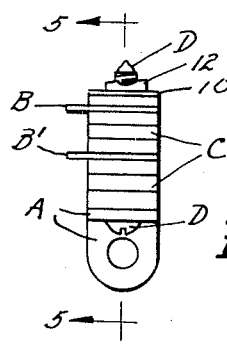
Figure 5:
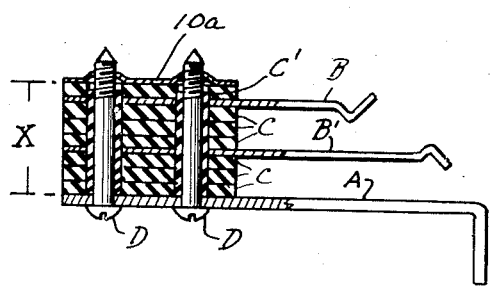
Figure 6:
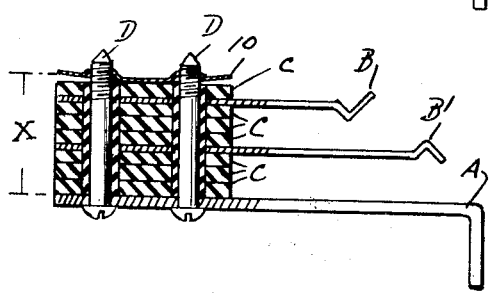

In the drawing, Fig. 1 is a perspective of my fastening device; Fig. 2 is an edge view thereof; Fig. 3 is a side elevation of an electric jack, parts of which are held together by my fastening device and a pair of bolts; Fig. 4 is an end view of the jack shown in Fig. 3; Fig. 5 is a longitudinal section of this jack on a central plane indicated by the line 5—5 on Fig. 4; Fig. 6 is a sectional elevation corresponding to Fig. 5, but showing the condition of the parts after the insulation shown in these figures has shrunk.

As shown in each of the views, the fastening device comprises a single elongated strip of resilient material 10, preferably of sheet metal and of uniform thickness and curved into an arc and provided with a bolt opening and an associated thread engager on each side of the central region. These bolt openings are indicated at 11 and each of the thread engagers is shown as comprising a pair of opposed tongues 12 formed from the material of the body and bent upwardly on the concave side thereof into opposed approximately acute angles to the body. Each tongue has a notch 14 in its end and the two tongues are warped in opposite directions, so that the edges defined by these end notches provide in effect one helical turn corresponding to the thread of the bolt to be used.

In making the fastener, I provide on each side of the central region two spaced longitudinal slits designated 15 and a transverse central opening connecting the slits and indicated generally at 16. This slitting and puncturing operation provides the two tongues 12 detached from the body at their free adjacent ends and on the two sides but anchored to the body at their distant ends. These tongues are then bent up at an approximately acute angle to the curved body and are warped to give the helical turn described.

Figs. 3 to 6 inclusive disclose my new fastening device in one of its uses. In these views A indicates a suitable support, B and B' two metallic electric conductors, C plates of insulation spacing the conductors apart and spacing them from the support, and D a pair of screw bolts passing through the parts mentioned and finding their nuts in the thread engagers of the fastening device 10. C' indicates insulating sleeves which may pass through the insulating slabs and metallic bars and surround the screw bolts D.

Fig. 3 discloses in broken lines, designated 10, the normal unapplied condition of the fastener of Figs. 1 and 2, and this view shows in full lines the fastener after the two screw bolts D have been driven home through the two thread engagers in the fastener and have pulled the same down into a plane as shown at 10—a. It will be seen that when the fastener has been thus straightened its reactance furnishes a continuous pressure against the members clamped, so that in this instance the strips of insulation and the contact members are constantly maintained in tight engagement, though the insulation may shrink after being installed.

The condition described is further indicated in Fig. 6 where the condition is shown after the insulation has shrunk. In this view and in the corresponding Fig. 5, the distance X from the upper face of the support to the under face of the fastener is a constant, but as the embraced material is shrunk (as in Fig. 6) space is developed between the upper layer of insulation and the ends of the fastener, though the various layers of insulation and the conductor bars are maintained in snug engagement by reason of the downward pressure of the intermediate region of the curved fastener.

If, on the other hand, the material camped were of a nature which would eventually expand in use, then the original installation might be as indicated in Fig. 6 and the form after expansion as indicated in Fig. 5.

It will be seen that my fastener is very simple in construction and may be cheaply made and readily applied. It does away with the necessity for individual nuts and nut-locks, as it provides its own nut-lock for each bolt, and has the further advantage of maintaining a continuously tight clamping engagement notwithstanding change in the cross section of the member or members clamped.

I claim:

A bowed body of resilient sheet material having two bolt openings respectively on the opposite sides of the crest of the body, the material of the body being deformed about the bolt openings on the concave side of the body to provide thread engagers of a pitch not less than the thickness of the body.

GEORGE A. TINNERMAN.